US012654269B2

(12) United States Patent
Shin et al.

(10) Patent No.: US 12,654,269 B2
(45) Date of Patent: Jun. 16, 2026

(54) TRANSFER DEVICE

(71) Applicant: SK ON CO., LTD., Seoul (KR)

(72) Inventors: Dong Whan Shin, Daejeon (KR); Hye Ju Jang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 330 days.

(21) Appl. No.: 18/426,354

(22) Filed: Jan. 30, 2024

(65) Prior Publication Data

US 2024/0261920 A1 Aug. 8, 2024

(30) Foreign Application Priority Data

Feb. 3, 2023 (KR) ......................... 10-2023-0014921
Dec. 21, 2023 (KR) ......................... 10-2023-0188663

(51) Int. Cl.
 *B23Q 3/18* (2006.01)
 *B23Q 3/10* (2006.01)
 *B23Q 7/04* (2006.01)
 *B65G 41/00* (2006.01)
 *B65G 47/90* (2006.01)
(52) U.S. Cl.
 CPC ............. *B23Q 3/186* (2013.01); *B23Q 3/106* (2013.01); *B23Q 7/043* (2013.01); *B65G 41/007* (2013.01); *B65G 47/901* (2013.01); *B23Q 2703/12* (2013.01)

(58) Field of Classification Search
 CPC .... B23Q 3/186; B23Q 3/106; H01M 10/0404
 See application file for complete search history.

(56) References Cited

FOREIGN PATENT DOCUMENTS

EP          3955332 A1 * 2/2022 .......... H01M 50/209
KR      10-2461774 B1    11/2022
KR    10-2023-0001679 A    1/2023

OTHER PUBLICATIONS

Extended European Search Report for European Patent Application No. 24155409.6 issued by the European Patent Office on Oct. 4, 2024.

* cited by examiner

*Primary Examiner* — Jason L Vaughan
*Assistant Examiner* — Amanda Kreiling
(74) *Attorney, Agent, or Firm* — IP & T GROUP LLP

(57) ABSTRACT
A transfer device is disclosed. The transfer device comprises a transfer rail extending in a longitudinal direction, a carrier movably coupled to the transfer rail in the longitudinal direction of the transfer rail, and a gripper assembly including a gripper module connected to the carrier. The gripper module includes a gripper frame extending in a width direction of the transfer rail and connected to the carrier, a cell mount coupled to an upper face of the gripper frame, and an alignment unit including an alignment body coupled to the gripper frame and an alignment arm movably coupled to the alignment body in at least one of a longitudinal direction or a width direction of the gripper frame.

20 Claims, 5 Drawing Sheets

300

310

TRANSFER DEVICE

CROSS-REFERENCE TO RELATED APPLICATIONS

This patent document claims the priority and benefits of Korean Patent Application Nos. 10-2023-0014921 and 10-2023-0188663 filed on Feb. 3, 2023 and Dec. 21, 2023, which is incorporated herein by reference in its entirety.

TECHNICAL FIELD

The technology and implementations disclosed in this patent document generally relate to a transfer device. In particular, the disclosed technology relates to a transfer device transferring battery cells.

BACKGROUND

When battery cells or jelly-rolls included in the battery cells are transferred one by one, a speed of the entire battery manufacturing process may be relatively slow.

SUMMARY

The disclosed technology can be implemented in some embodiments to provide a transfer device transferring battery cells or jelly-rolls disposed up and down.

In one aspect of the disclosed technology, a transfer device may comprise a transfer rail configured to extend in a longitudinal direction, a carrier movably coupled to the transfer rail in the longitudinal direction of the transfer rail, and a gripper assembly including a gripper module connected to the carrier. The gripper module may include a gripper frame configured to extend in a width direction of the transfer rail and to be connected to the carrier, a cell mount coupled to an upper face of the gripper frame, and an alignment unit including an alignment body coupled to the gripper frame and an alignment arm movably coupled to the alignment body in at least one of a longitudinal direction or a width direction of the gripper frame.

According to an embodiment of the disclosed technology, a transfer device transferring battery cells or jelly-rolls disposed up and down can be provided.

A transfer device based on some embodiments of the disclosed technology can be widely applied in green technology fields such as electric vehicles, battery charging stations, and other battery-based solar power generation and wind power generation.

A transfer device based on some embodiments of the disclosed technology can be used in eco-friendly electric vehicles, hybrid vehicles, etc. to prevent climate change by suppressing air pollution and greenhouse gas emissions.

BRIEF DESCRIPTION OF THE DRAWINGS

The accompanying drawings illustrate examples of embodiments of various technical features disclosed in the disclosure.

DETAILED DESCRIPTION

Reference will now be made in detail to embodiments of the disclosed technology, examples of which are illustrated in the accompanying drawings. However, the following description is merely an example and does not intended to limit the disclosed technology to a specific implementation.

Figure 1:
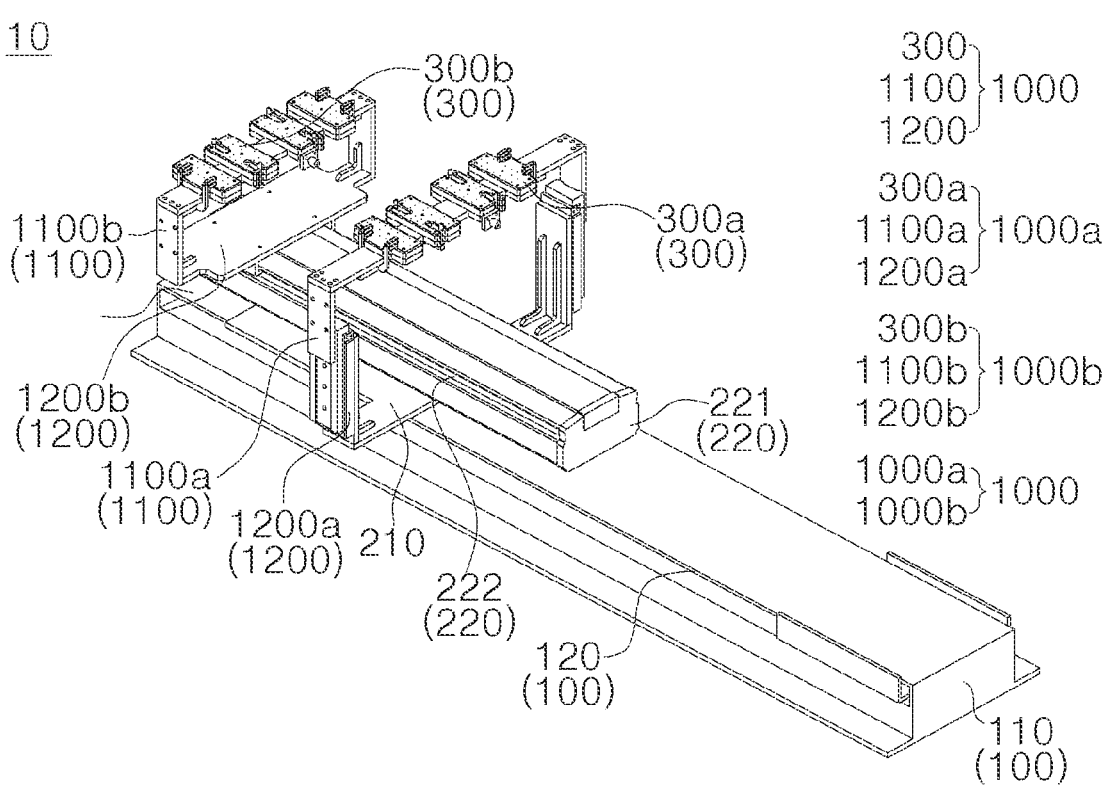
FIG. 1 illustrates a transfer device based on an embodiment of the disclosed technology.

FIG. 1 illustrates a transfer device based on an embodiment of the disclosed technology.

Referring to FIG. 1, a transfer device 10 may include a transfer rail 100. The transfer rail 100 may include a transfer rail body 110. The transfer rail body 110 may have a shape extending in one direction.

For example, the transfer rail body 110 may have a shape extending in a longitudinal direction of the transfer rail body 110. For example, the longitudinal direction of the transfer rail body 110 may be a forward-rearward direction. For another example, the transfer rail body 110 may be curved.

The transfer rail 100 may include a transfer rail guide 120. The transfer rail guide 120 may be formed on the transfer rail body 110. A longitudinal direction of the transfer rail guide 120 may be parallel to the longitudinal direction of the transfer rail body 110.

For example, the transfer rail guide 120 may include a groove formed in the transfer rail body 110. For another example, the transfer rail guide 120 may be a protrusion formed on the transfer rail body 110.

The transfer device 10 may include a carrier 200. The carrier 200 may include a carrier frame 210. The carrier frame 210 may have the shape of a plate or a board.

The carrier frame 210 may be movably coupled to the transfer rail guide 120. For example, the carrier frame 210 may be slidably coupled to the transfer rail guide 120.

The carrier frame 210 may move on the transfer rail 100. For example, the carrier frame 210 may move in the forward-rearward direction along the transfer rail guide 120.

The carrier 200 may include a carrier slider 220. The carrier slider 220 may include a carrier slider body 221. The carrier slider body 221 may have a shape extending in the longitudinal direction.

A longitudinal direction of the carrier slider body 221 may be parallel to the longitudinal direction of the transfer rail 100. For example, the longitudinal direction of the carrier slider body 221 may be the forward-rearward direction.

The carrier slider body 221 may be coupled to the carrier frame 210. For example, the carrier slider body 221 may be coupled or fixed to an upper face of the carrier frame 210.

The carrier slider 220 may include a carrier slider guide 222. The carrier slider guide 222 may be formed on the carrier slider body 221. For example, the carrier slider guide 222 may be a groove or a protrusion formed on the carrier slider body 221.

A longitudinal direction of the carrier slider guide 222 may be parallel to at least one of the longitudinal direction of the carrier slider body 221 or the longitudinal direction of the transfer rail guide 120.

The transfer device 10 may include a gripper assembly 1000. A plurality of gripper assemblies 1000 may be provided. The gripper assembly 1000 may include or indicate at least one of the plurality of gripper assemblies 1000.

For example, the transfer device 10 may include a first gripper assembly 1000a and a second gripper assembly 1000b. The gripper assembly 1000 may include or indicate at least one of the first gripper assembly 1000a or the second gripper assembly 1000b.

The gripper assembly 1000 may include a gripper module 300. The gripper module 300 may be positioned on the transfer rail 100. The gripper module 300 may be positioned on the carrier 200.

A plurality of gripper modules 300 may be provided. For example, the first gripper assembly 1000a may include a first gripper module 300a. For example, the second gripper assembly 1000b may include a second gripper module 300b. The gripper module 300 may include or indicate at least one of the first gripper module 300a or the second gripper module 300b.

The gripper module 300 may grip a jelly-roll (not shown) or a battery cell (not shown). For example, the gripper module 300 may releasably grip the jelly-roll (not shown) or the battery cell (not shown). For example, the gripper module 300 may releasably secure the jelly-roll (not shown) or the battery cell (not shown). The jelly-roll (not shown) may include an electrode assembly constituting the battery cell (not shown).

For example, the jelly-roll (not shown) or the battery cell (not shown) may be releasably coupled to the gripper module 300. For example, the jelly-roll (not shown) or the battery cell (not shown) may be releasably secured to the gripper module 300.

The gripper assembly 1000 may include a gripper support 1100. A plurality of gripper supports 1100 may be provided. For example, the first gripper assembly 1000a may include a first gripper support 1100a. For example, the second gripper assembly 1000b may include a second gripper support 1100b.

The gripper support 1100 may include or indicate at least one of the plurality of gripper supports 1100. For example, the gripper support 1100 may include or indicate at least one of the first gripper support 1100a or the second gripper support 1100b.

The gripper support 1100 may be connected, coupled, or fixed to the gripper module 300. For example, the gripper support 1100 may form a shape extending downward from an end of the gripper module 300.

For example, the first gripper support 1100a may form a shape extending downward from an end of the first gripper module 300a. For example, the first gripper support 1100a may have a shape extending up and down.

A plurality of first gripper supports 1100a may be provided. For example, the first gripper assembly 1000a may include a pair of first gripper supports 1100a.

For example, the second gripper support 1100b may form a shape extending downward from an end of the second gripper module 300b. For example, the second gripper support 1100b may have a shape extending up and down.

A plurality of second gripper supports 1100b may be provided. For example, the second gripper assembly 1000b may include a pair of second gripper supports 1100b.

The gripper assembly 1000 may include a gripper mover 1200. The gripper mover 1200 may be connected or coupled to the gripper support 1100. The gripper mover 1200 may be connected or coupled to the carrier 200.

A plurality of gripper movers 1200 may be provided. For example, the first gripper assembly 1000a may include a first gripper mover 1200a. For example, the second gripper assembly 1000b may include a second gripper mover 1200b.

The gripper mover 1200 may include or indicate at least one of the plurality of gripper movers 1200. For example, the gripper mover 1200 may include or indicate at least one of the first gripper mover 1200a or the second gripper mover 1200b.

The first gripper mover 1200a may be coupled or fixed to the carrier 200. For example, the first gripper mover 1200a may be coupled or fixed to the carrier frame 210.

A plurality of first gripper movers 1200a may be provided. For example, the first gripper assembly 1000a may include a pair of first gripper movers 1200a.

The first gripper mover 1200a may have a shape extending in an up-down direction.

For example, the first gripper mover 1200a may have a shape extending upward from the carrier frame 210.

The first gripper mover 1200a may be coupled to the first gripper support 1100a. For example, a pair of first gripper movers 1200a may be respectively coupled to a pair of first gripper supports 1100a.

For example, the first gripper support 1100a may be movably coupled to the first gripper mover 1200a. For example, the first gripper support 1100a may move in a longitudinal direction of the first gripper mover 1200a. For example, the first gripper support 1100a may move on the first gripper mover 1200a in the up-down direction.

For example, the second gripper assembly 1000b may include a single second gripper mover 1200b.

The second gripper mover 1200b may be positioned behind the first gripper mover 1200a. The second gripper mover 1200b may be coupled or connected to the carrier 200.

For example, the second gripper mover 1200b may be movably coupled to the carrier slider 220. For example, the second gripper mover 1200b may move along the carrier slider guide 222.

At least a portion of a lower face of the second gripper mover 1200b may face an upper face of the carrier slider 220. The second gripper mover 1200b may have the shape of a plate or board.

The second gripper mover 1200b may be coupled or fixed to the second gripper support 1100b. For example, both ends of the second gripper mover 1200b may be respectively fixed or coupled to a pair of second gripper supports 1100b.

Figure 2:
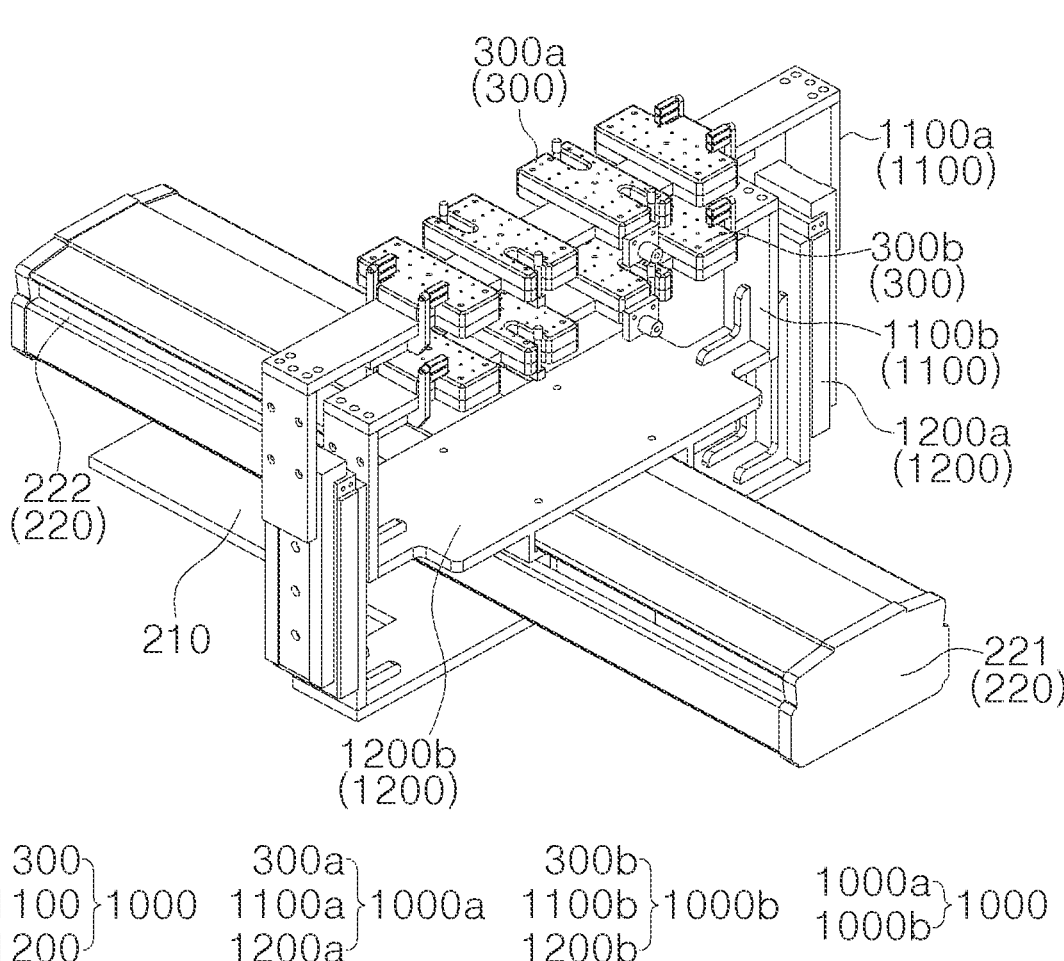
FIG. 2 illustrates a carrier and a gripper assembly illustrated in FIG. 1 and illustrates that a first gripper module and a second gripper module are disposed up and down.

FIG. 2 illustrates the carrier and the gripper assembly illustrated in FIG. 1 and illustrates that the first gripper module and the second gripper module are disposed up and down.

Referring to FIGS. 1 and 2, the first gripper support 1100a may move with respect to the first gripper mover 1200a. For example, after the first gripper module 300a mounts the battery cell (not shown), the first gripper support 1100a may upward move on the first gripper mover 1200a.

When the first gripper support 1100a upward moves on the first gripper mover 1200a, the first gripper module 300a may move upward. When the first gripper module 300a moves upward, the first gripper module 300a may be positioned above the second gripper module 300b.

The second gripper mover 1200b may move with respect to the carrier 200. For example, the second gripper mover 1200b may move back and forth on the carrier slider 220.

For example, after the second gripper module 300b mounts the battery cell (not shown), the second gripper mover 1200b may move forward on the carrier slider 220. For example, the second gripper mover 1200b may move toward the first gripper mover 1200a.

When the second gripper mover 1200b moves toward the first gripper mover 1200a, the second gripper module 300b may be positioned below the first gripper module 300a.

In a state in which the first gripper module 300a is positioned above the second gripper module 300b, the carrier 200 may move on the transfer rail 100. For example, the carrier frame 210 may move forward along the transfer rail 100.

As the carrier frame 210 moves forward along the transfer rail 100, the gripper module 300 may transfer forward the battery cell (not shown). For example, a pair of battery cells (not shown) may be transferred forward in a state in which the battery cells are respectively gripped by the first gripper module 300a and the second gripper module 300b.

After the battery cell (not shown) is transferred forward as the gripper module 300 moves forward, the battery cell (not shown) may be disengaged from the gripper module 300. After the battery cell (not shown) is disengaged from the gripper module 300, the battery cell (not shown) may be separated from the gripper module 300 and put into the next process.

Figure 3:
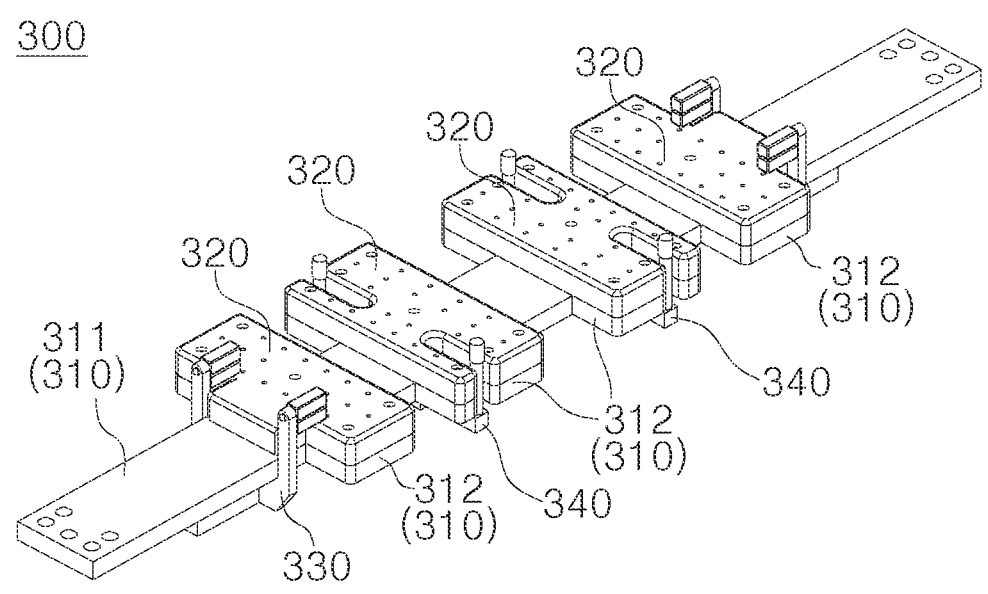
FIG. 3 illustrates a gripper module illustrated in FIG. 1.

FIG. 3 illustrates the gripper module illustrated in FIG. 1.

Referring to FIG. 3, the gripper module 300 may include a gripper frame 310. The gripper frame 310 may include a gripper frame body 311. Both ends of the gripper frame body 311 may be connected, coupled, or fixed to a pair of gripper supports 1100 (see FIGS. 1 and 2).

The gripper frame body 311 may form an overall shape extending in one direction. For example, the gripper frame body 311 may form a shape extending in a width direction of the transfer rail 100 (see FIG. 1).

The gripper frame 310 may include a gripper frame bed 312. For example, the gripper frame bed 312 may extend or protrude from the gripper frame body 311 in a width direction of the gripper frame body 311. For example, the gripper frame bed 312 may extend or protrude from the gripper frame body 311 in the forward-rearward direction.

The gripper frame bed 312 may be coupled or connected to the gripper frame body 311. A plurality of gripper frame beds 312 may be provided.

The gripper module 300 may include a cell mount 320. The cell mount 320 may be connected or coupled to the gripper frame 310. For example, the cell mount 320 may be connected or coupled to an upper face of the gripper frame bed 312. A plurality of cell mounts 320 may be provided.

The gripper module 300 may include a first alignment unit 330. The first alignment unit 330 may be connected, coupled, or fixed to the gripper frame 310.

A portion of the first alignment unit 330 may move with respect to another portion of the first alignment unit 330. For example, a portion of the first alignment unit 330 may move in a longitudinal direction of the gripper frame body 311 with respect to another portion of the first alignment unit 330. For example, a portion of the first alignment unit 330 may move in a left-right direction with respect to another portion of the first alignment unit 330.

The gripper module 300 may include a second alignment unit 340. The second alignment unit 340 may be connected, coupled, or fixed to the gripper frame 310.

A portion of the second alignment unit 340 may move with respect to another portion of the second alignment unit 340. For example, a portion of the second alignment unit 340 may move in a width direction of the gripper frame body 311 with respect to another portion of the second alignment unit 340. For example, a portion of the second alignment unit 340 may move in the forward-rearward direction with respect to another portion of the second alignment unit 340.

Figure 4:
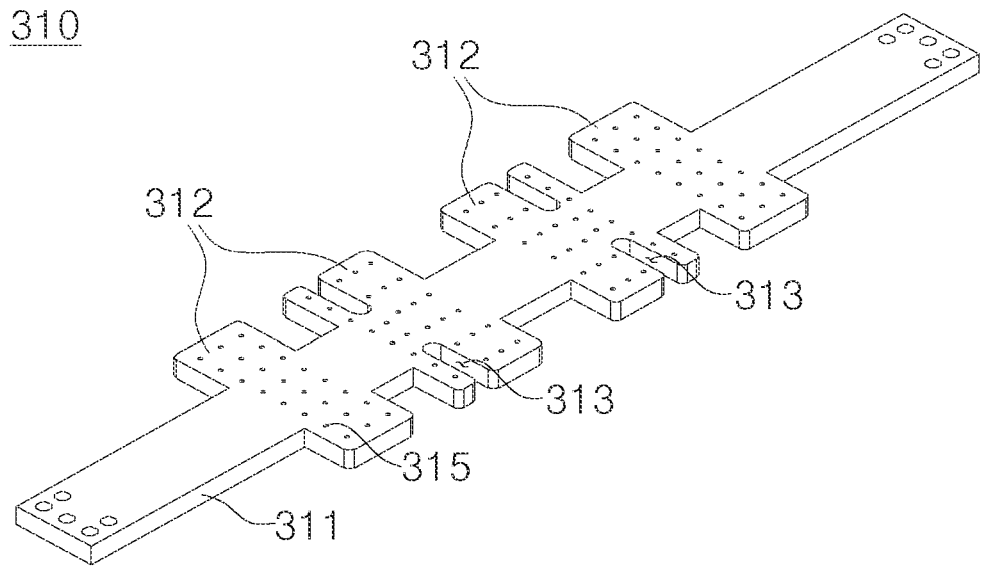
FIG. 4 illustrates a gripper frame illustrated in FIG. 3.

FIG. 4 illustrates the gripper frame illustrated in FIG. 3.

Referring to FIG. 4, the gripper frame 310 may include the gripper frame body 311. The gripper frame body 311 may form a shape extending in the longitudinal direction.

For example, the gripper frame body 311 may form the shape of a plate or board. For example, the gripper frame body 311 may form an upper face and a lower face. The upper face of the gripper frame body 311 may face upward or face the upward. The lower face of the gripper frame body 311 may face downward or face the downward.

The gripper frame 310 may include the gripper frame bed 312. The gripper frame bed 312 may form a shape extending from the gripper frame body 311.

For example, the gripper frame bed 312 may have a shape extending from the gripper frame body 311 in the width direction or the forward-rearward direction of the gripper frame body 311.

For another example, the gripper frame bed 312 may overlap the gripper frame body 311. For example, a portion of the gripper frame bed 312 may form a portion of the gripper frame body 311.

The gripper frame bed 312 may form the shape of a plate or board. For example, the gripper frame bed 312 may form an upper face and a lower face.

The upper face of the gripper frame bed 312 may be connected to the upper face of the gripper frame body 311. For example, the upper face of the gripper frame bed 312 and the upper face of the gripper frame body 311 may form the same plane.

The plurality of gripper frame beds 312 may be provided. For example, the gripper frame 310 may include the plurality of gripper frame beds 312. The plurality of gripper frame beds 312 may be disposed along the longitudinal direction of the gripper frame body 311. The plurality of gripper frame beds 312 may be spaced apart from each other.

The gripper frame 310 may include a gripper frame guide 313. The gripper frame guide 313 may be formed in the gripper frame bed 312. The gripper frame guide 313 may be open up and down.

For example, the gripper frame guide 313 may form a shape indented from an outer edge of the gripper frame bed 312 toward the gripper frame body 311.

For another example, the gripper frame guide 313 may be a hole formed in the gripper frame bed 312. For example, the gripper frame guide 313 may be a hole with a shape extending in the width direction or the forward-rearward direction of the gripper frame body 311.

The gripper frame guide 313 may pass through up and down the gripper frame bed 312. The gripper frame guide 313 may be connected to the upper face and the lower face of the gripper frame bed 312.

The gripper frame guide 313 may have a shape extending in the longitudinal direction. For example, the gripper frame guide 313 may have a shape extending in the width direction of the gripper frame body 311.

The gripper frame guide 313 may be coupled to the second alignment unit 340. For example, a portion of the second alignment unit 340 may move in the gripper frame guide 313.

For example, a portion of the second alignment unit 340 may move in the gripper frame guide 313 in the longitudinal direction of the gripper frame guide 313.

The gripper frame 310 may include a gripper frame gas hole 315. The gripper frame gas hole 315 may be formed in at least one of the gripper frame body 311 or the gripper frame bed 312. A plurality of gripper frame gas holes 315 may be provided.

The gripper frame gas hole 315 may be open upward. The gripper frame gas hole 315 may be closed downward. The gripper frame gas hole 315 may spray gas upward. For example, the gripper frame gas hole 315 may spray air upward.

Figure 5:
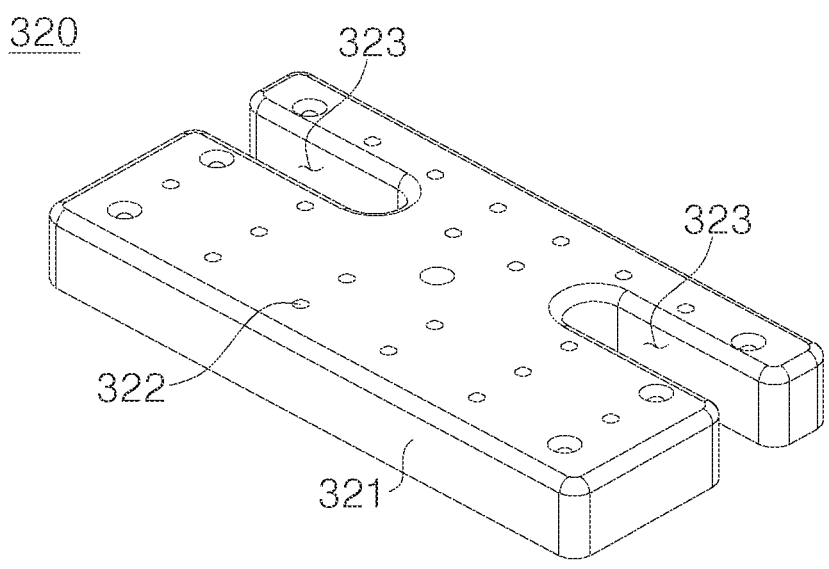
FIG. 5 illustrates a cell mount illustrated in FIG. 3.

FIG. 5 illustrates the cell mount illustrated in FIG. 3.

Referring to FIG. 5, the cell mount 320 may include a cell mount body 321. A material of the cell mount body 321 may be different from a material of the gripper frame 310 (see FIG. 4).

For example, a rigidity of the cell mount body 321 may be less than a rigidity of the gripper frame 310 (see FIG. 4). For example, the gripper frame 310 (see FIG. 4) may be formed of a material containing metal. For example, the cell mount body 321 may be formed of a material containing silicon or polymer.

The cell mount body 321 may form the shape of a plate or board. For example, the cell mount body 321 may form an upper face and a lower face.

The lower face of the cell mount body 321 may face the gripper frame 310 (see FIG. 4). For example, the lower face of the cell mount body 321 may be coupled or connected to the upper face of the gripper frame body 311 (see FIG. 4) and the upper face of the gripper frame bed 312 (see FIG. 4).

When the battery cell (not shown) is mounted on the cell mount 320, the upper face of the cell mount body 321 may face the battery cell (not shown) or may be in contact with the battery cell (not shown).

The cell mount 320 may include a cell mount gas hole 322. A plurality of cell mount gas holes 322 may be provided. The cell mount gas hole 322 may be a hole formed in the cell mount body 321.

For example, the cell mount gas hole 322 may form a recessed shape on the upper face of the cell mount body 321. For example, the cell mount gas hole 322 may be open up and down.

For example, the cell mount gas hole 322 may be connected to the upper face and the lower face of the cell mount body 321. A lower end of the cell mount gas hole 322 may face an upper end of the gripper frame gas hole 315 (see FIG. 4). For example, the cell mount gas hole 322 may communicate with the gripper frame gas hole 315 (see FIG. 4).

The cell mount gas hole 322 may be provided with gas from the gripper frame gas hole 315 (see FIG. 4). The cell mount gas hole 322 may spray upward the provided gas.

The cell mount 320 may include a cell mount guide 323. The cell mount guide 323 may be formed in the cell mount body 321. The cell mount guide 323 may be open up and down.

A shape of the cell mount guide 323 may correspond to a shape of the gripper frame guide 313. The cell mount guide 323 may be connected to or communicate with the gripper frame guide 313.

For example, the cell mount guide 323 may form a shape indented from an outer edge of the cell mount body 321 toward the inside of the cell mount body 321. For example, the cell mount guide 323 may form a shape indented from the outer edge of the cell mount body 321 toward the gripper frame body 311 (see FIG. 4).

For another example, the cell mount guide 323 may be a hole formed in the cell mount body 321. For example, the cell mount guide 323 may be a hole extending in the width direction of the gripper frame body 311 (see FIG. 4) or in the front-rear direction.

The cell mount guide 323 may pass through the cell mount body 321. For example, the cell mount guide 323 may be connected to the upper face and the lower face of the cell mount body 321.

The cell mount guide 323 may have a shape extending in the longitudinal direction. For example, the cell mount guide 323 may have a shape extending in the width direction of the gripper frame body 311 (see FIG. 4).

The cell mount guide 323 may be positioned above the gripper frame guide 313 (see FIG. 4). The cell mount guide 323 may communicate with the gripper frame guide 313 (see FIG. 4).

Figure 6:
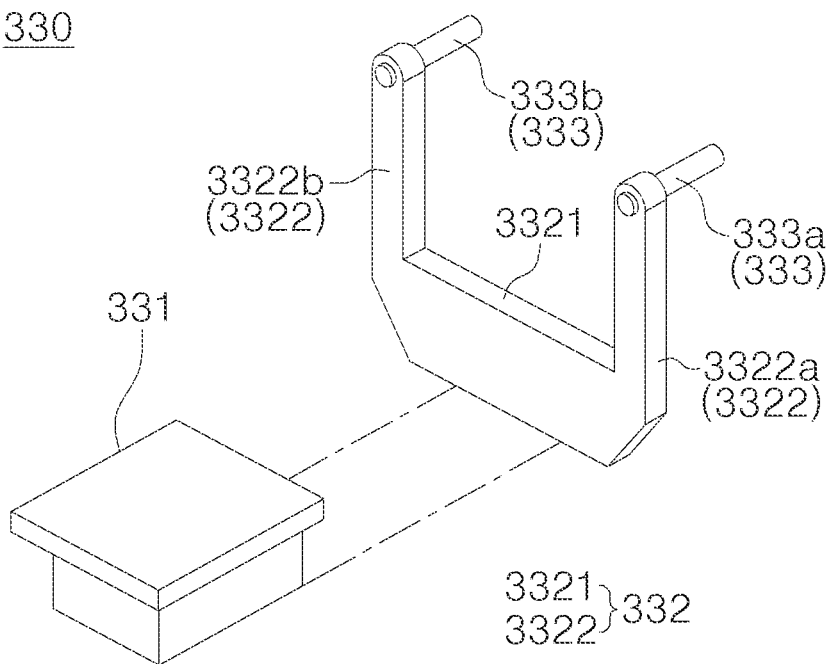
FIG. 6 illustrates a first alignment unit illustrated in FIG. 3.

FIG. 6 illustrates the first alignment unit illustrated in FIG. 3.

Referring to FIGS. 3 and 6, the first alignment unit 330 may include a first alignment body 331. The first alignment body 331 may be coupled or fixed to the gripper frame 310 (see FIG. 4).

For example, the first alignment body 331 may be coupled or fixed to at least one of the gripper frame body 311 (see FIG. 4) or the gripper frame bed 312 (see FIG. 4). For example, the first alignment body 331 may be coupled or fixed to the gripper frame body 311 (see FIG. 4).

The first alignment body 331 may generate a driving force. For example, the first alignment body 331 may include a motor. For example, the first alignment body 331 may include a step motor or a servo motor.

For another example, the first alignment body 331 may generate the driving force using a fluid. For example, the first alignment body 331 may generate the driving force using a gas pressure. For example, the first alignment body 331 may generate the driving force using an oil pressure.

The first alignment unit 330 may include a first alignment arm 332. The first alignment arm 332 may be coupled to the first alignment body 331.

For example, the first alignment arm 332 may be coupled to a portion of the first alignment body 331. The portion of the first alignment body 331 may move with respect to another portion of the first alignment body 331.

The first alignment arm 332 is movable. For example, the first alignment arm 332 may receive the driving force from the first alignment body 331.

For example, the first alignment arm 332 may move in the longitudinal direction of the gripper frame body 311 (see FIG. 4). For example, the first alignment arm 332 may move in the left-right direction.

The first alignment arm 332 may include a first alignment arm base 3321. The first alignment arm base 3321 may be positioned below the gripper frame 310 (see FIG. 3).

The first alignment arm base 3321 may form a shape extending in the width direction of the gripper frame body 311 (see FIG. 4). For example, the first alignment arm base 3321 may form a shape extending in the forward-rearward direction. The first alignment arm base 3321 may be connected or coupled to the first alignment body 331.

The first alignment arm base 3321 may be positioned below the gripper frame 310 (see FIG. 4). For example, the first alignment arm 332 may form a "U" shape.

The first alignment arm 332 may include a first alignment arm wing 3322. A plurality of first alignment arm wings 3322 may be provided. For example, the first alignment arm 332 may include a pair of first alignment arm wings 3322. For example, the first alignment arm 332 may include a front first alignment arm wing 3322a and a rear first alignment arm wing 3322b.

The first alignment arm wing 3322 may include or indicate at least one of the front first alignment arm wing 3322*a* or the rear first alignment arm wing 3322*b*.

The first alignment arm wing 3322 may be connected, coupled, or fixed to the first alignment arm base 3321. For example, the first alignment arm wing 3322 may form a shape extending upward from the first alignment arm base 3321.

For example, the front first alignment arm wing 3322*a* may form a shape extending upward from a front end of the first alignment arm base 3321. For example, the rear first alignment arm wing 3322*b* may form a shape extending upward from a rear end of the first alignment arm base 3321.

The front first alignment arm wing 3322*a*, the first alignment arm base 3321, and the rear first alignment arm wing 3322*b* may be sequentially connected. The front first alignment arm wing 3322*a*, the first alignment arm base 3321, and the rear first alignment arm wing 3322*b* may be formed integrally.

The rear first alignment arm wing 3322*b* may be positioned behind the front first alignment arm wing 3322*a*. For example, the gripper frame body 311 (see FIG. 4) may be positioned between the front first alignment arm wing 3322*a* and the rear first alignment arm wing 3322*b*. For example, the gripper frame 310 (see FIG. 4) may pass through between the front first alignment arm wing 3322*a* and the rear first alignment arm wing 3322*b*.

The first alignment unit 330 may include a first alignment finger 333. The first alignment finger 333 may be connected or coupled to the first alignment arm 332. For example, the first alignment finger 333 may be connected or coupled to an upper end of the first alignment arm 332.

For example, the first alignment finger 333 may protrude from the first alignment arm wing 3322. For example, the first alignment finger 333 may protrude from the first alignment arm wing 3322 toward the cell mount 320 (see FIG. 3).

A plurality of first alignment fingers 333 may be provided. For example, the first alignment unit 330 may include a front first alignment finger 333*a* and a rear first alignment finger 333*b*.

The first alignment finger 333 may include or indicate at least one of the front first alignment finger 333*a* or the rear first alignment finger 333*b*. The first alignment finger 333 may be positioned above the upper face of the cell mount 320.

For example, the front first alignment finger 333*a* may protrude from the front first alignment arm wing 3322*a*. For example, the rear first alignment finger 333*b* may protrude from the rear first alignment arm wing 3322*b*.

Figure 7:
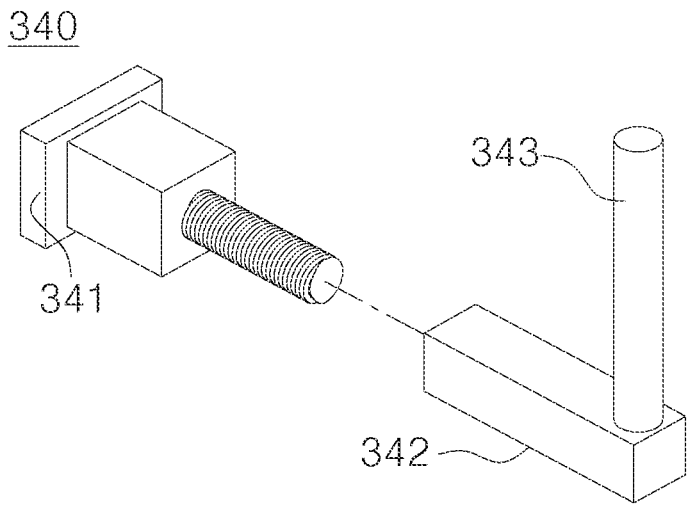
FIG. 7 illustrates a second alignment unit illustrated in FIG. 3.

FIG. 7 illustrates the second alignment unit illustrated in FIG. 3.

Referring to FIGS. 3 to 7, the second alignment unit 340 may include a second alignment body 341. The second alignment body 341 may be coupled or fixed to the gripper frame 310 (see FIG. 4).

For example, the second alignment body 341 may be coupled or fixed to at least one of the gripper frame body 311 (see FIG. 4) or the gripper frame bed 312 (see FIG. 4). For example, the second alignment body 341 may be coupled or fixed to the gripper frame bed 312 (see FIG. 4).

The second alignment body 341 may generate a driving force. For example, the second alignment body 341 may include a motor. For example, the second alignment body 341 may include a step motor or a servo motor.

For another example, the second alignment body 341 may generate the driving force using a fluid. For example, the second alignment body 341 may generate the driving force using a gas pressure. For example, the second alignment body 341 may generate the driving force using an oil pressure.

The second alignment unit 340 may include a second alignment arm 342. The second alignment arm 342 may be coupled to the second alignment body 341.

The second alignment arm 342 may form a shape extending in the longitudinal direction. For example, the longitudinal direction of the second alignment arm 342 may be parallel to the width direction of the gripper frame body 311 (see FIG. 4). For example, the longitudinal direction of the second alignment arm 342 may be parallel to the forward-rearward direction.

For example, the second alignment arm 342 may be coupled to a portion of the second alignment body 341. The portion of the second alignment body 341 may move with respect to another portion of the second alignment body 341.

The second alignment arm 342 is movable. For example, the second alignment arm 342 may receive the driving force from the second alignment body 341.

For example, the second alignment arm 342 may move in the width direction of the gripper frame body 311 (see FIG. 4). For example, the second alignment arm 342 may move in the forward-rearward direction.

The second alignment unit 340 may include a second alignment finger 343. The second alignment finger 343 may be connected or coupled to the second alignment arm 342. An upper end of the second alignment finger 343 may be positioned above upper face of the cell mount body 321 (see FIG. 5).

For example, one end of the second alignment arm 342 may be coupled to the second alignment body 341, and other end of the second alignment arm 342 may be coupled to the second alignment finger 343. For example, the second alignment finger 343 may form a shape extending upward from the other end of the second alignment arm 342.

The second alignment finger 343 may be positioned on the gripper frame guide 313 (see FIG. 4) and the cell mount guide 323 (see FIG. 5). For example, the second alignment finger 343 may be inserted into the gripper frame guide 313 (see FIG. 4) and the cell mount guide 323 (see FIG. 5).

The second alignment finger 343 may move in the gripper frame guide 313 (see FIG. 4) and the cell mount guide 323 (see FIG. 5). For example, the second alignment finger 343 may move in the gripper frame guide 313 (see FIG. 4) and the cell mount guide 323 (see FIG. 5) in the width direction or the forward-rearward direction of the gripper frame body 311 (see FIG. 4).

Referring to FIGS. 1 to 7, the alignment units 330 and 340 may include or indicate at least one of the first alignment unit 330 or the second alignment unit 340.

The alignment bodies 331 and 341 may include or indicate at least one of the first alignment body 331 or the second alignment body 341. The alignment bodies 331 and 341 may be coupled or fixed to the gripper frame 310.

The alignment arms 332 and 342 may include or indicate at least one of the first alignment arm 332 or the second alignment arm 342. The alignment arms 332 and 342 may be movably coupled to the alignment bodies 331 and 341. For example, the alignment arms 332 and 342 may be movably coupled to the alignment bodies 331 and 341 in at least one of the longitudinal direction or the width direction of the gripper frame body 311.

The alignment fingers 333 and 343 may include or indicate at least one of the first alignment finger 333 or the second alignment finger 343. The alignment fingers 333 and

343 may form a shape extending from the alignment arms 332 and 342. For example, the alignment fingers 333 and 343 may protrude from the alignment arms 332 and 342 in the direction in which the alignment arm 332 moves or in the direction perpendicular to the movement of the alignment arm 342.

Figure 8:
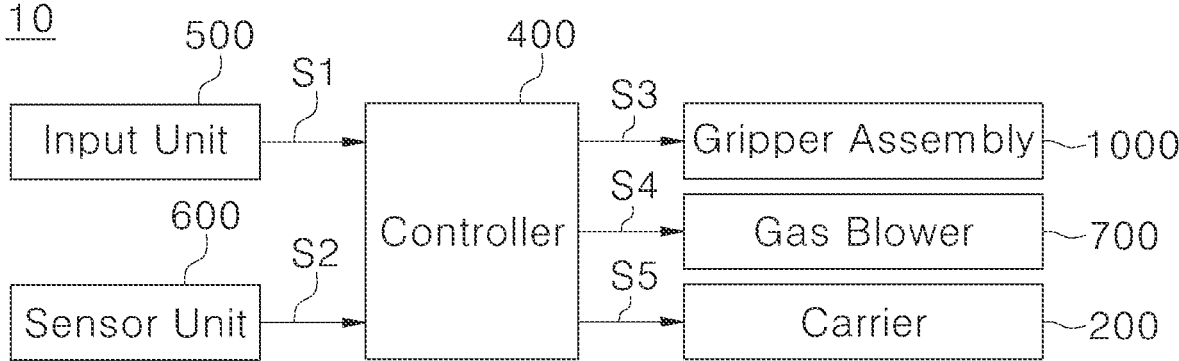
FIG. 8 is a block diagram of a transfer device based on an embodiment of the disclosed technology.

FIG. 8 is a block diagram of a transfer device based on an embodiment of the disclosed technology.

Referring to FIGS. 1 to 8, the transfer device 10 may include a controller 400. The controller 400 may process signals. The controller 400 may generate signals. The controller 400 may perform calculations.

The controller 400 may be implemented through at least one of a computer, a server, a central processing unit (CPU), a graphical processing unit (GPU), a processor, a circuit board, or a printed circuit board (PCB).

The transfer device 10 may include an input unit 500. The input unit 500 may obtain an input from a user, etc. The input unit 500 may transmit a first signal S1 to the controller 400.

The first signal S1 may include information on the input. For example, the first signal S1 may include information on operation instructions for at least one of the carrier 200, the gripper module 300, or a gas blower 700.

The transfer device 10 may include a sensor unit 600. When the battery cell (not shown) is mounted on the cell mount 320, the sensor unit 600 may measure a position of the battery cell (not shown) with respect to the cell mount 320.

The sensor unit 600 may generate a second signal S2. The second signal S2 may include information on the position of the battery cell (not shown) with respect to the cell mount 320. The second signal S2 may be transmitted to the controller 400.

The controller 400 may generate output signals S3, S4, and S5 based on the input signals S1 and S2. For example, the controller 400 may generate the output signals S3, S4, and S5 by inputting the input signals S1 and S2 into a predetermined algorithm.

The input signals S1 and S2 may include or indicate at least one of the first signal S1 or the second signal S2. The output signals S3, S4, and S5 may include or indicate at least one of the third signal S3, the fourth signal S4, or the fifth signal S5.

The gripper assembly 1000 may receive the third signal S3. The third signal S3 may include information on an operation of the gripper mover 1200. The third signal S3 may include information on an operation of the gripper module 300.

The gripper assembly 1000 may operate in response to the third S3. For example, at least one of the first alignment unit 330 or the second alignment unit 340 may operate based on the position of the battery cell (not shown) mounted on the cell mount 320. At least one of the first alignment unit 330 or the second alignment unit 340 operates in response to the third signal S3, and thus the position of the battery cell (not shown) with respect to the cell mount 320 can be aligned.

For example, the gripper mover 1200 may operate in response to the third signal S3. For example, the first gripper module 300a may rise in a state in which the battery cell (not shown) is mounted on the first gripper module 300a. For example, the second gripper mover 1200b may move forward in a state in which the battery cell (not shown) is mounted on the second gripper module 300b.

The transfer device 10 may include the gas blower 700. The gas blower 700 may be coupled or connected to the gripper frame 310. The gas blower 700 may provide gas to the gripper frame 310.

When the gas blower 700 provides gas to the gripper frame 310, the gripper frame gas hole 315 may deliver the gas to the cell mount gas hole 322. The cell mount gas hole 322 may spray the gas upward.

When the battery cell (not shown) is positioned above the cell mount 320, the cell mount gas hole 322 may spray the gas toward the battery cell (not shown). When the cell mount gas hole 322 sprays the gas toward the battery cell (not shown), friction between the cell mount 320 and the battery cell (not shown) may be reduced.

The gas blower 700 may receive the fourth signal S4. The fourth signal S4 may include information on an operation of the gas blower 700. The gas blower 700 may operate in response to the fourth signal S4.

The carrier 200 may receive the fifth signal S5. The carrier 200 may operate in response to the fifth signal S5. For example, the carrier 200 may move back and forth on the transfer rail 100 in response to the fifth signal S5.

For example, after the battery cell (not shown) is mounted on the gripper module 300 and the first gripper module 300a and the second gripper module 300b are disposed up and down, the carrier 200 may move forward on the transfer rail 100 in response to the fifth signal S5.

After the carrier 200 moves forward on the transfer rail 100, the gripper module 300 may operate in response to the third signal S3. For example, after the carrier 200 moves forward on the transfer rail 100, the first alignment finger 333 and the second alignment finger 343 may move away from the cell mount 320.

Hence, the coupling between the gripper module 300 and the battery module (not shown) can be released. After the coupling between the gripper module 300 and the battery module (not shown) is released, the battery module (not shown) can be separated from the gripper module 300.

After the battery cell (not shown) is separated from the gripper module 300, the carrier 200 may move backward on the transfer rail 100 in response to the fifth signal S5.

After the carrier 200 moves backward on the transfer rail 100, the second gripper mover 1200b may move backward on the carrier slider 220, and the first gripper support 1100a may move downward from the first gripper mover 1200a.

Only specific examples of implementations of certain embodiments are described. Variations, improvements and enhancements of the disclosed embodiments and other embodiments may be made based on the disclosure of this patent document.

What is claimed is:

1. A transfer device comprising:
    a transfer rail configured to extend in a longitudinal direction thereof;
    a carrier movably coupled to the transfer rail in the longitudinal direction of the transfer rail; and
    a gripper assembly including a gripper module connected to the carrier,
    wherein the gripper module includes:
    a gripper frame configured to extend in a width direction of the transfer rail and be connected to the carrier;
    a cell mount coupled to an upper face of the gripper frame; and
    an alignment unit including:
        an alignment body coupled to the gripper frame; and an alignment arm movably coupled to the alignment body in at least one of a longitudinal direction or a width direction of the gripper frame.

2. The transfer device of claim 1, wherein the alignment unit further includes an alignment finger protruding from the alignment arm.

3. The transfer device of claim 2, wherein the gripper module includes a first alignment unit as the alignment unit, and wherein the first alignment unit includes:

a first alignment body as the alignment body, the first alignment body coupled to the gripper frame;

a first alignment arm as the alignment arm, the first alignment arm movably coupled to the first alignment body in the longitudinal direction of the gripper frame; and a first alignment finger as the alignment finger, the first alignment finger protruding from the first alignment arm in a direction in which the first alignment arm moves.

4. The transfer device of claim 3, wherein the first alignment finger is positioned above an upper face of the cell mount.

5. The transfer device of claim 3, wherein the first alignment arm includes:

a first alignment arm base coupled to the first alignment body; and a pair of first alignment arm wings extending from the first alignment arm base and spaced apart from each other.

6. The transfer device of claim 5, wherein the gripper frame passes through between the pair of first alignment arm wings.

7. The transfer device of claim 6, wherein the first alignment arm base is positioned below the gripper frame.

8. The transfer device of claim 2, wherein the gripper module includes a second alignment unit as the alignment unit, and wherein the second alignment unit includes:

a second alignment body as the alignment body, the second alignment body coupled to the gripper frame;

a second alignment arm as the alignment arm, the second alignment arm movably coupled to the second alignment body in the width direction of the gripper frame; and a second alignment finger as the alignment finger, the second alignment finger protruding upward from the second alignment arm.

9. The transfer device of claim 8, wherein an end of the second alignment arm is coupled to the second alignment body, and wherein another end of the second alignment arm is coupled to the second alignment finger.

10. The transfer device of claim 9, wherein the cell mount includes:

a cell mount body coupled to the upper face of the gripper frame; and a cell mount guide configured to pass through the cell mount body and be connected to a lower face and an upper face of the cell mount body.

11. The transfer device of claim 10, wherein the second alignment finger is positioned in the cell mount guide.

12. The transfer device of claim 11, wherein an upper end of the second alignment finger is positioned above the upper face of the cell mount body.

13. The transfer device of claim 10, wherein the gripper frame includes:

a gripper frame body extending in the longitudinal direction of the gripper frame; and a gripper frame bed extending from the gripper frame body in the width direction of the gripper frame and positioned below the cell mount.

14. The transfer device of claim 13, wherein the gripper frame further includes a gripper frame guide configured to pass through the gripper frame bed, be connected to a lower face and an upper face of the gripper frame bed, and communicate with the cell mount guide.

15. The transfer device of claim 14, wherein the second alignment finger is positioned in the cell mount guide and the gripper frame guide.

16. The transfer device of claim 1, wherein the cell mount includes a plurality of cell mounts, and wherein the plurality of cell mounts are disposed in the longitudinal direction of the gripper frame.

17. The transfer device of claim 1, wherein the cell mount includes:

a cell mount body coupled to the upper face of the gripper frame; and at least one cell mount gas hole configured to form a recessed shape in an upper face of the cell mount body and spray a gas upward.

18. The transfer device of claim 1, further comprising:

a first gripper assembly as the gripper assembly, the first gripper assembly connected to the carrier, wherein the first gripper assembly includes:

a first gripper mover fixed to the carrier;

a first gripper support being upward and downward movably coupled to the first gripper mover; and a first gripper module as the gripper module, the first gripper module coupled to the first gripper support.

19. The transfer device of claim 18, wherein the carrier includes:

a carrier frame movably coupled to the transfer rail; and a carrier slider coupled to an upper face of the carrier frame and extending in the longitudinal direction of the transfer rail, wherein the first gripper mover is fixed to the carrier frame.

20. The transfer device of claim 19, further comprising:

a second gripper assembly as the gripper assembly, the second gripper assembly movably coupled to the carrier slider, wherein the second gripper assembly includes:

a second gripper mover movably coupled to the carrier slider;

a second gripper support coupled to the second gripper mover; and a second gripper module as the gripper module, the second gripper module coupled to the second gripper support.

* * * * *